(12) United States Patent
Foster et al.

(10) Patent No.: US 10,648,490 B2
(45) Date of Patent: May 12, 2020

(54) BELLOWS SYSTEM FOR FLUID END (71) Applicant: Kerr Machine Co., Sulphur, OK (US)

(72) Inventors: Kelcy Jake Foster, Ardmore, OK (US);
Mark S. Nowell, Ardmore, OK (US);
Guy J. Lapointe, Sulphur, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 16/043,579

(22) Filed: Jul. 24, 2018

(65) Prior Publication Data

US 2019/0032685 A1 Jan. 31, 2019

Related U.S. Application Data

(60) Provisional application No. 62/537,342, filed on Jul. 26, 2017.

(51) Int. Cl.
| | |
|---|---|
| *F15B 15/10* | (2006.01) |
| *F16K 5/04* | (2006.01) |
| *F16J 3/06* | (2006.01) |
| *F16K 5/18* | (2006.01) |
| *F04B 39/10* | (2006.01) |
| *F04B 1/053* | (2020.01) |
| *F04B 53/14* | (2006.01) |
| *F04B 1/0408* | (2020.01) |
| *F04B 1/0538* | (2020.01) |
| *F04B 1/0448* | (2020.01) |
| *F04B 9/04* | (2006.01) |

(52) U.S. Cl.
CPC .......... *F15B 15/10* (2013.01); *F04B 1/0408* (2013.01); *F04B 1/0448* (2013.01); *F04B 1/053* (2013.01); *F04B 1/0538* (2013.01); *F04B 39/10* (2013.01); *F04B 53/14* (2013.01); *F04B 53/143* (2013.01); *F16J 3/06* (2013.01); *F16K 5/0464* (2013.01); *F16K 5/0471* (2013.01); *F16K 5/184* (2013.01); *F04B 9/042* (2013.01)

(58) Field of Classification Search
CPC ........ F04B 9/107; F04B 39/047; F04B 45/02; F04B 45/0333; F04B 43/107
See application file for complete search history.

(56) References Cited

U.S. PATENT DOCUMENTS

| 2,856,857 | A | * | 10/1958 | Saalfrank | ............... | F04B 43/067 |
| | | | | | | 417/385 |
| 3,257,952 | A | * | 6/1966 | McCormick | .......... | F04B 43/107 |
| | | | | | | 417/383 |
| 4,047,850 | A | * | 9/1977 | Berthelot | ............... | B01L 3/0206 |
| | | | | | | 417/383 |

(Continued)

*Primary Examiner* — Thomas E Lazo
*Assistant Examiner* — Matthew Wiblin
(74) *Attorney, Agent, or Firm* — Tomlionson McKinstry, P.C.

(57) ABSTRACT

A fluid end with an internal bellows can be used in high pressure environments. The bellows is disposed within a plunger bore, and has an interior isolated from a working chamber of the fluid end. An end of a plunger is received in the interior of the bellows. The bellows contains an incompressible fluid at a constant volume. As the plunger extends into the interior of the bellows, the fluid it contains is displaced. Such fluid displacement causes the bellows to extend. As the plunger is retracted, the fluid replaces the volume formerly displaced by the plunger, and causes the bellows to accordion to a retracted position.

21 Claims, 7 Drawing Sheets

(56) References Cited

U.S. PATENT DOCUMENTS

| | | | | |
|---|---|---|---|---|
| 4,778,347 A | * | 10/1988 | Mize | F04B 15/02 |
| | | | | 29/221.6 |
| 4,948,349 A | * | 8/1990 | Koiwa | F04B 53/1002 |
| | | | | 137/516.11 |
| 4,984,970 A | * | 1/1991 | Eickmann | F04B 43/0063 |
| | | | | 417/271 |
| 2008/0008605 A1 | * | 1/2008 | Bauer | F02M 59/102 |
| | | | | 417/375 |
| 2016/0123313 A1 | * | 5/2016 | Simmons | F04B 9/133 |
| | | | | 417/53 |

* cited by examiner

BELLOWS SYSTEM FOR FLUID END

FIELD

The present invention relates generally to fluid end assemblies for high pressure fracturing pumps for use in oil and gas operations.

SUMMARY

The present invention is directed to a fluid end. The fluid end comprises a body, a plunger, and a bellows. The body has an external surface and a plunger bore disposed therein. The plunger bore opens at the external surface. The plunger has a first end disposed within the plunger bore. The bellows has an interior separated from its exterior. The bellows is situated in the plunger bore and at least partially surrounds the plunger.

The present invention is further directed to a kit. The kit is for use within a plunger bore of a fluid end. The kit comprises a retainer nut, an elongate plunger, and a bellows. The retainer nut has a centrally deposed opening extending through therethrough. The plunger is receivable through the opening of the retainer nut.

DETAILED DESCRIPTION

Fluid end assemblies are typically used in oil and gas operations to deliver highly pressurized corrosive and/or abrasive fluids to piping leading to the wellbore. The assemblies are typically attached to power ends run by engines. The power ends reciprocate plungers within the assemblies to pump fluid throughout the fluid end. Fluid may be pumped through the fluid end at pressures that range from 5,000-15,000 pounds per square inch (psi). Fluid used in high pressure hydraulic fracturing operations is typically pumped through the fluid end at a minimum of 8,000 psi; however, fluid will normally be pumped through the fluid end at pressures around 10,000-15,000 psi during such operations. One such illustrative fluid end is shown in U.S. Pat. Pub. No. 2018/0017173, Nowell, et al., the contents of which are incorporated herein by reference.

One drawback of conventional systems is that seals must be used to prevent leakage around the reciprocating plunger. Specifically, seals must be installed on the internal surface of the retainer nut, through which the plunger extends. Fracturing fluid is abrasive, and such fluid at high pressure may cause wear on the reciprocating plunger and damage to the seals over time. Therefore, it would be advantageous to limit the exposure of dynamic seals to the high pressure, abrasive fracturing fluid.

Turning to the figures, a fluid end 10 is shown. The fluid end has a manifold body or housing 11. The housing may be formed in one piece, or may be formed of multiple sections, such as sections 11a and 11b shown in FIGS. 1-4. When a multi-piece body 11 is used, through-holes 13 allow for connectors (not shown), such as bolts, to connect sections 11a, 11b.

The housing 11 typically has a first conduit 20 and a second conduit 21 formed within the body 11 that intersect to form an internal working chamber 22. The first conduit 20 is typically orthogonal to the second conduit 21. The first conduit 20 may have aligned first and second sections 23 and 24 that are situated on opposite sides of the internal chamber 22. The second conduit 21 may also be referred to herein as a plunger bore.

The conduits 20, 21 each may independently interconnect the internal chamber 22 to an external surface 27 of the fluid end 10. Fluid travels into the chamber 22 through an inlet opening 40 when an inlet valve 42 is open. Fluid travels out of the chamber 22 to a discharge opening 44 when a discharge valve 46 is open. A plunger 28 having a smooth external surface reciprocates within the plunger bore 21 to change the effective volume of the internal chamber 22. As shown, the plunger 28 is disposed in a bellows 100 seated within the plunger bore 21. The plunger 28 is driven by a power end (not shown) and powered by an engine.

Figure 1:
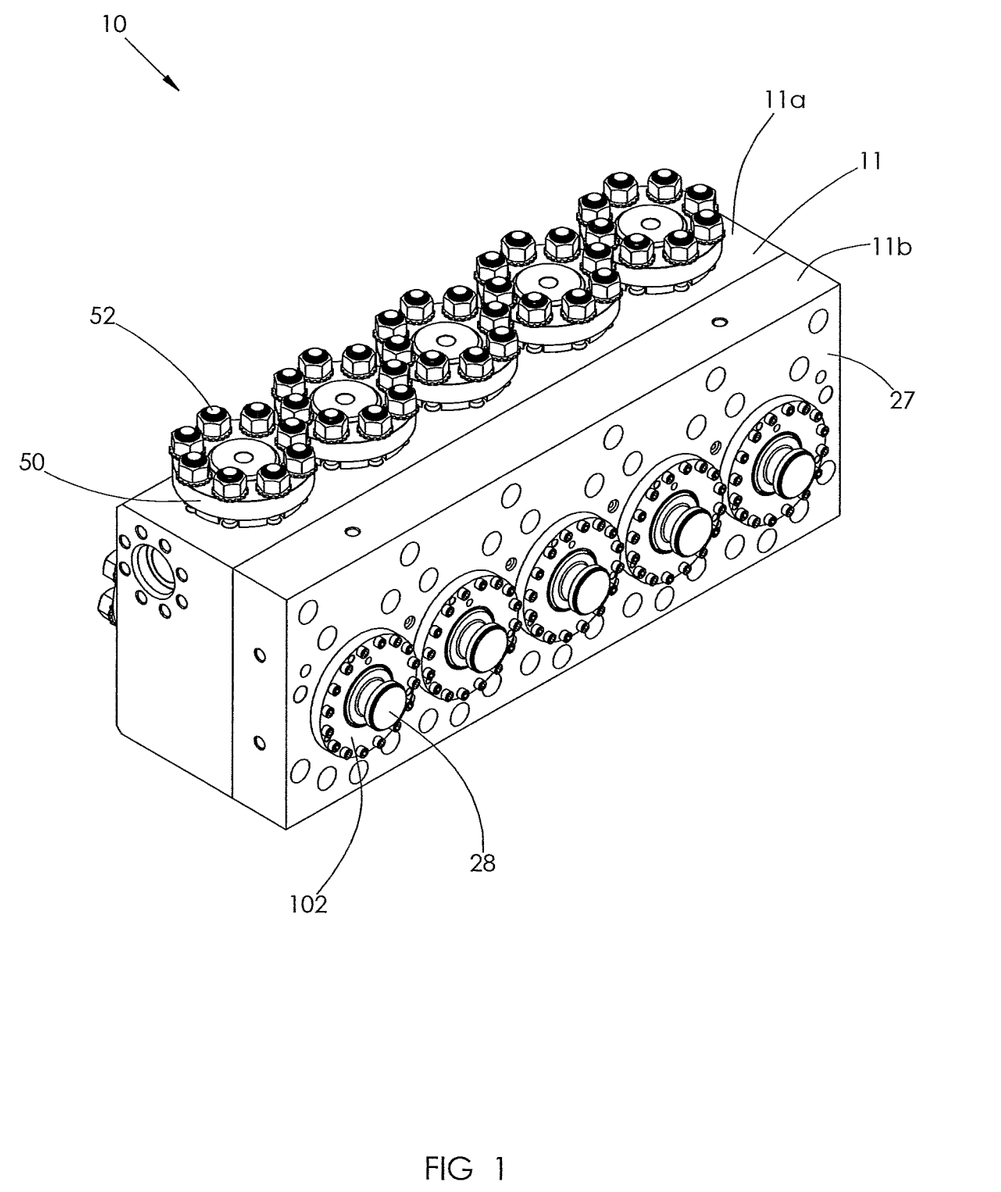
FIG. 1 is a top front right perspective view of a fluid end.
Figure 2:
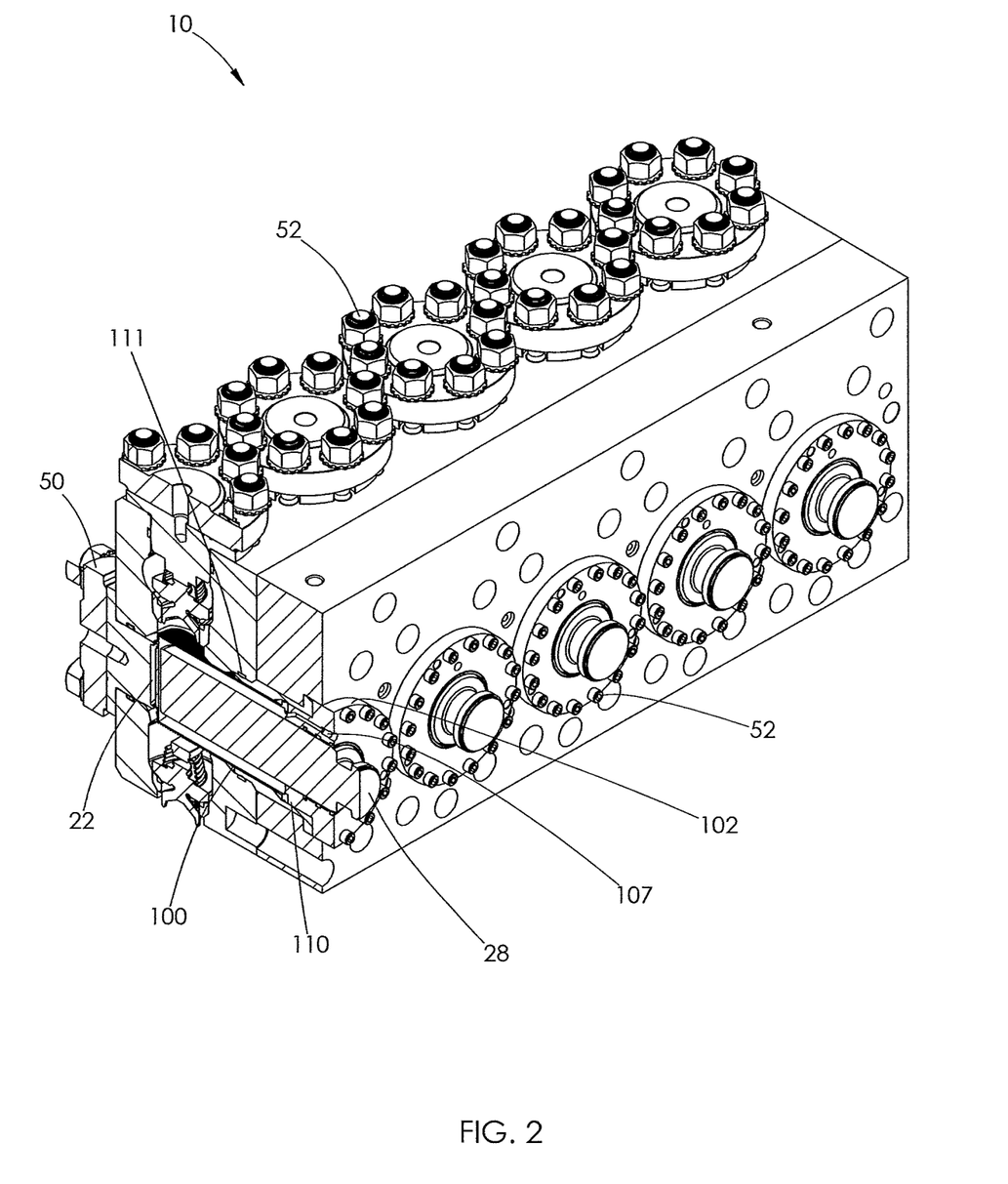
FIG. 2 is a top front right sectional view of the fluid end of FIG. 1.
Figure 3:
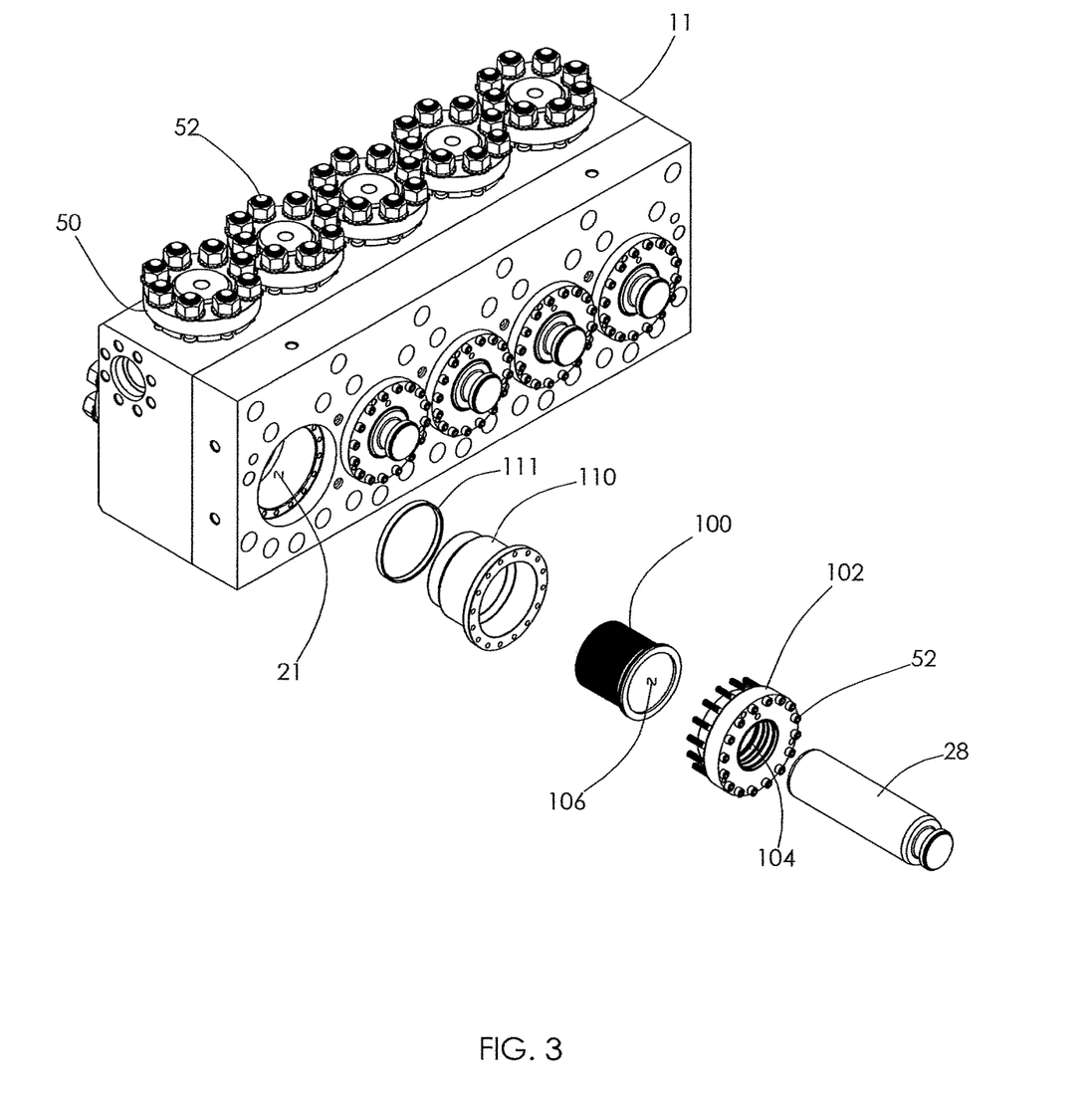
FIG. 3 an exploded view of the fluid end shown in FIG. 1.
Figure 4:
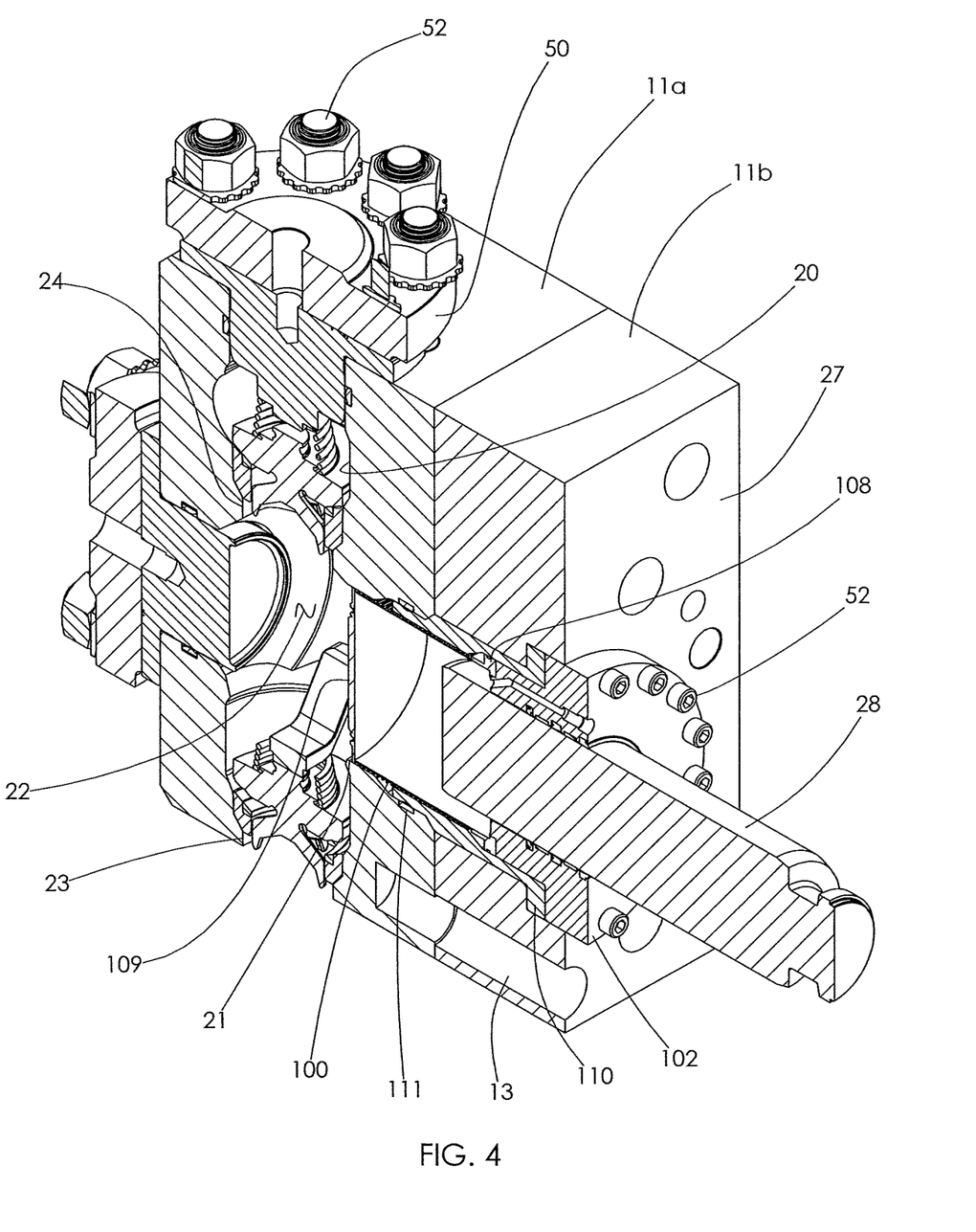
FIG. 4 is a top front right sectional view of one section of the fluid end of FIG. 1.

As shown in FIGS. 1, 2, and 3, fluid end 10 typically comprises three to five plungers 28 and an equal number of working chambers 22. In FIG. 1, a five-plunger, or quintiplex, fluid end 10 is shown. It should be understood that a bellows may be utilized in one, many, or all of the sections of a fluid end 10.

The first section 23 is a conduit that allows fluid to enter the body 11 at intake opening 40, and thereafter to move into the internal chamber. A one-way suction valve 42 is positioned within the first section 23, and prevents backflow in the direction of the intake opening 40.

The second section 24 is a conduit that allows fluid to exit the internal chamber 22, and thereafter leave the body 11 through the discharge opening 44. A one-way discharge valve 46 is positioned within the second section 24, and prevents backflow in the direction of the chamber 22.

A valve seat 29 is formed in each of the first and second sections 23 and 24. Each valve seat 29 is shaped to conform to a surface of the valve that is received within the same section. Thus the valve seat 29 within the first section 23 conforms to a surface of the suction valve 42. Likewise the valve seat 29 within the second section conforms to a surface of the discharge valve 46. The valves 42, 46 close against the removable valve seats 29 rather than against a surface of the manifold body 11. As wear due to valve closure occurs, that wear is focused primarily at the seats 29, rather than at the body 11. Replacement of worn seats is far less costly than replacement of a worn body 11. A spring 47 is received within each of the sections 23 and 24. Each spring engages the valve received within the same section, and biases that valve towards its seat.

Each plunger 28 preferably reciprocates out of phase with the other plungers. This phase relationship allows the fluid end 10 to maintain pressure within the body at an approximately constant level. Fluid output downstream from the body 11 is kept approximately constant as a result.

In the present invention, the fluid end 10 further comprises a bellows 100 and an annular retainer nut 102. The annular retainer nut 102 defines a centrally-disposed passage 104 therethrough. The plunger 28 extends through the passage 104 of the retainer nut 102 and into the bellows 100.

Several kits are useful for assembling a fluid end 10. A first kit comprises the bellows 100, retainer nut 102, and plunger 28 for placement within the plunger bore 21 of a fluid end 10, as shown in FIG. 3. A second kit comprises the same bellows 100, retainer nut 102, and plunger 28 for placement in a second plunger bore. Third, fourth and fifth kits may be used as well. Additional components of the fluid end 10 may be added to any of these kits.

The bellows 100 is preferably formed from a strong, durable and metallic material, and includes alternating folds or pleats 105. The bellows 100 may be made entirely of high-strength material, such as steel, or may be a composite of more than one such material. The pleats 105 permit the bellows 100 to move between retracted and extended positions. The bellows 100 has an exterior and interior. The exterior is exposed to the fluid and pressure of the internal chamber 22 and plunger bore 21 of the fluid end 10. The interior forms an internal cavity 106 that is isolated from the internal chamber 22 and plunger bore 21 by the bellows 100.

The portion of the plunger 28 extends through the passage 104 of the retainer nut 102 so that its end is disposed within the cavity 106. When in operation, the plunger 28 is at least partially surrounded by the bellows 100.

The cavity 106 is in fluid communication with a fluid passage 107 disposed in the annular retainer nut 102. The cavity 106 is preferably filled with a fluid. The fluid may be incompressible fluid, such as water, hydraulic oil, motor oil, or mineral oil. By "incompressible", what is meant is a fluid with a very low compressibility. Such fluid is pumped via the fluid passage 107 into the cavity 106. Once filled, the cavity and fluid passage are sealed.

Figure 5:
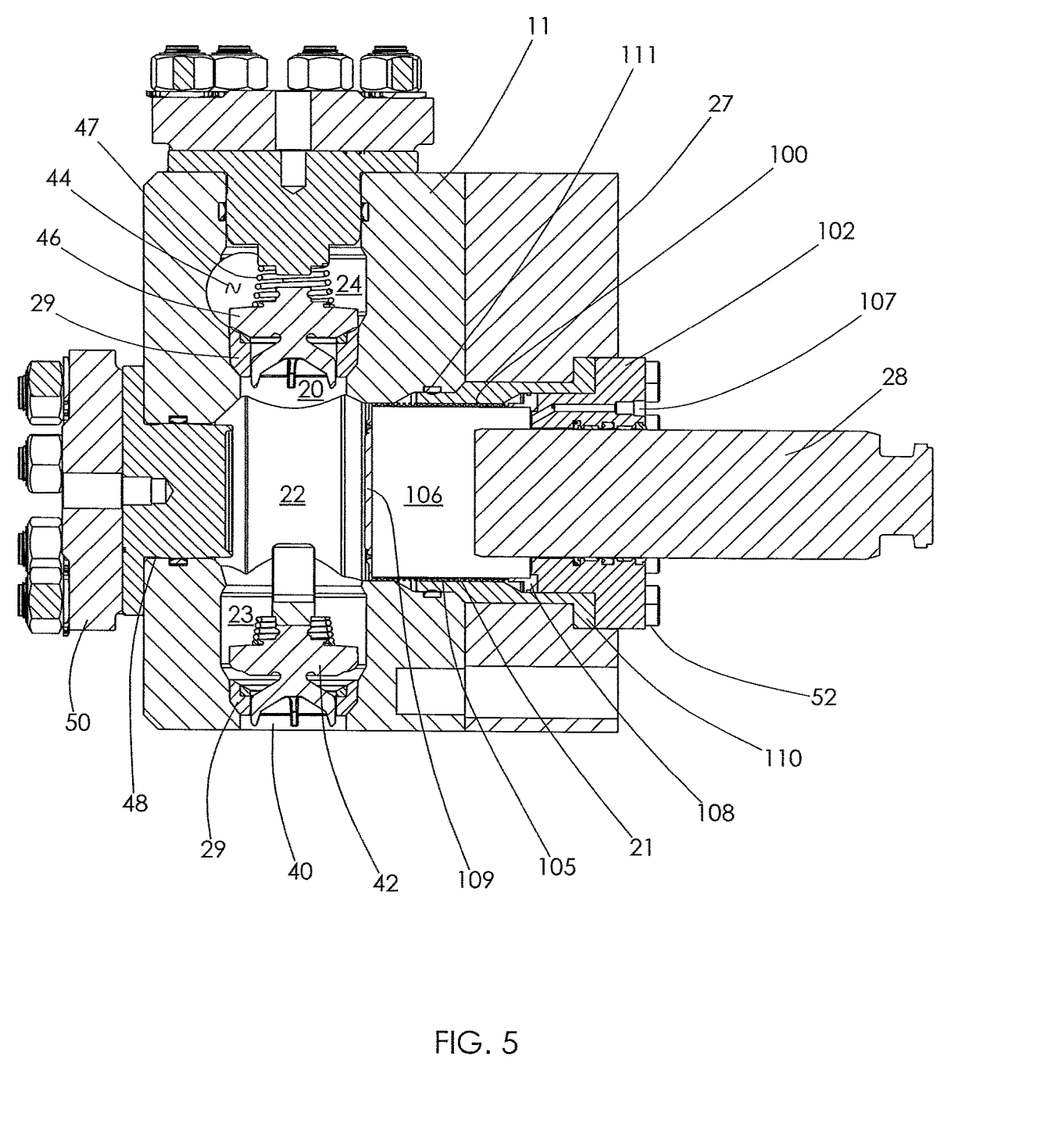
FIG. 5 is a side sectional view of a fluid end with the bellows in a retracted position.
Figure 6:
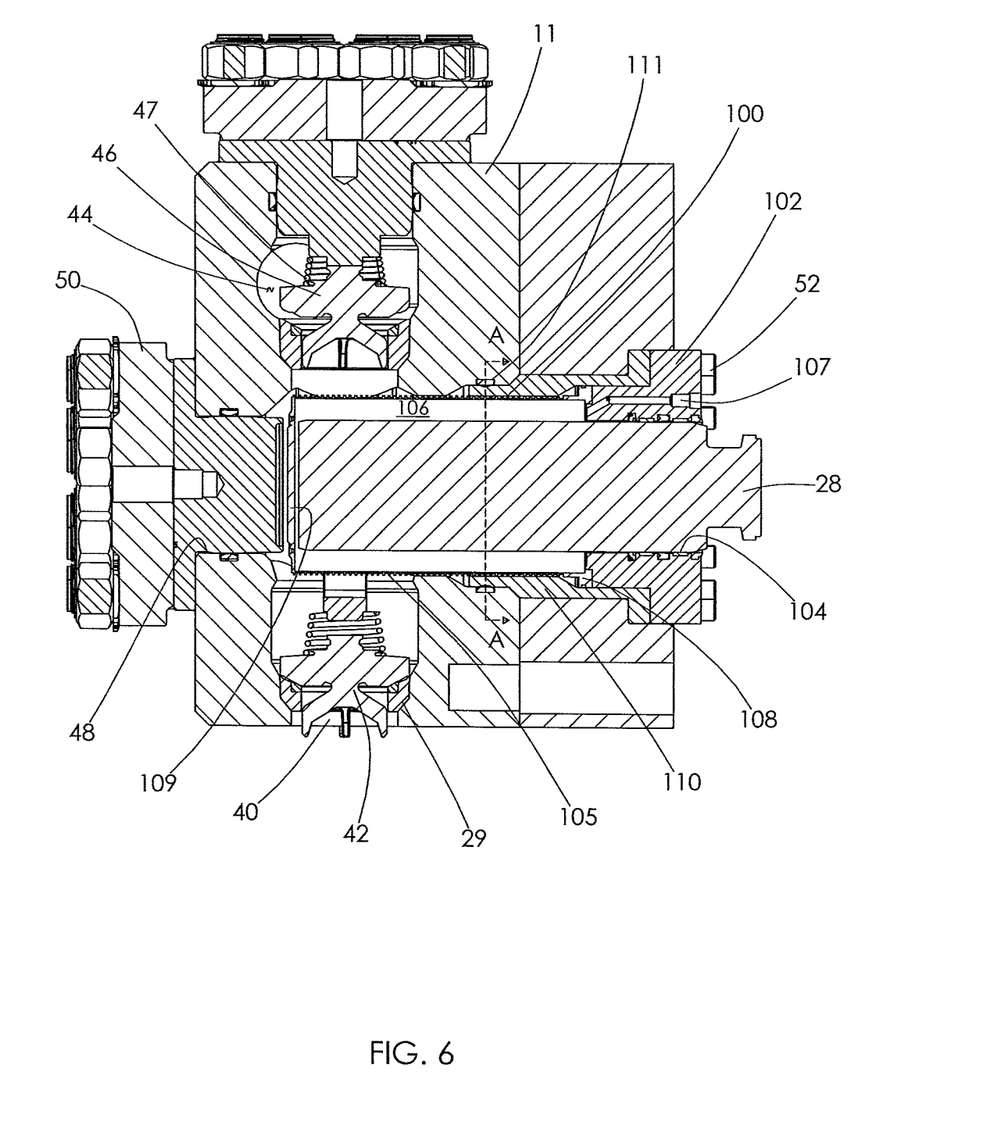
FIG. 6 is a side sectional view of the fluid end of FIG. 5 with the bellows in an extended position.

The volume of the fluid within the cavity is static. When the plunger 28 presses against the bellows 100, the cavity 106 deforms, and the fluid it contains is displaced. Such fluid displacement causes the bellows 100 to extend. As the plunger 28 retracts from the cavity, fluid fills the void left by the plunger, causing the bellows 100 to retract. Therefore, the cavity 106 displaces as shown by the difference between FIG. 5 and FIG. 6. The displacement of the cavity 106 is proportional to the additional plunger 28 volume disposed within the cavity.

The bellows 100 is positioned within the plunger bore 21, and secured at its first end 108 to the body 11. As shown, a stuffing sleeve 110 is disposed inside the plunger bore 21. The stuffing sleeve 110 surrounds the bellows adjacent its first end. This sleeve 110 is sealed against the body 11 at a radial seal 111. The sleeve 110 abuts the annular retainer nut 102. In one embodiment, the first end 108 may be attached to the body 11 adjacent the stuffing sleeve 110. As shown, the bellows 100 at its first end 108 is sandwiched between the retainer nut 102 and a shoulder formed in the stuffing sleeve 110.

Figure 7:
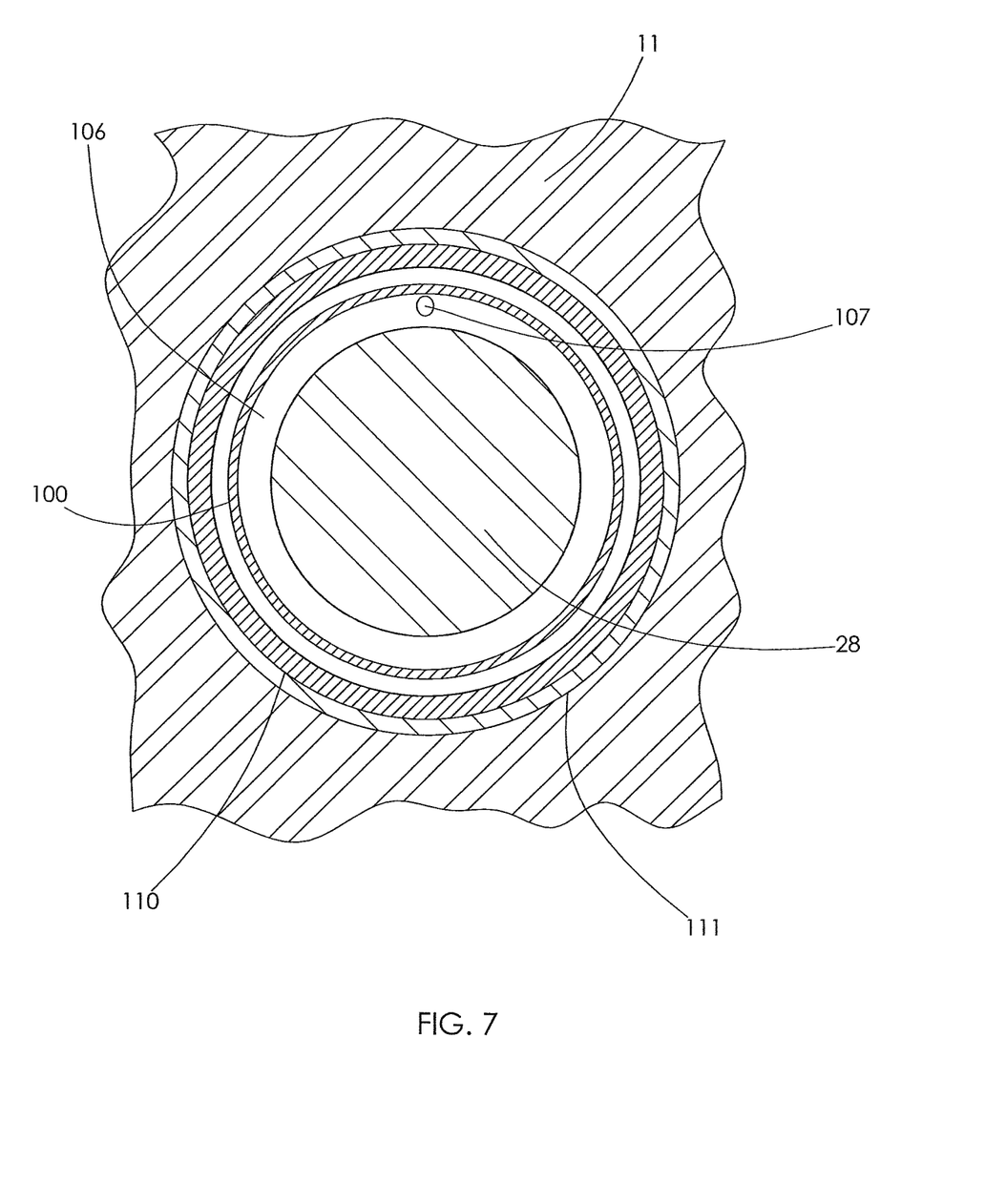
FIG. 7 is a rear sectional view of the fluid end of FIG. 6 taken along section A-A.

A second end 109 of the bellows 100 extends within the plunger bore 21 towards the working chamber 22. The second end log may be circular to match the sectional shape of the plunger bore 21. As shown in FIG. 7, each of the plunger bore 21, stuffing sleeve 110, bellows 100, and plunger 28 have a circular cross-section.

In order to better illustrate the invention, the bellows 100 is not to scale in the Figures. The wall forming the pleats 105 of the bellows 100 may in fact be much thinner than shown in the Figures. In one embodiment, the bellows 100 may have a thickness of a tenth of an inch or less along its wall.

In operation, as the plunger 28 is pushed into the cavity 106, the pleats 105 unfold, causing the bellows 100 to accordion into its extended position. The second end log of the bellows 100 displaces fluid within the working chamber 22, forcing the fluid past the discharge valve 46 and out of the discharge opening 44. The bellows 100 is shown in its extended position in FIG. 6.

As the plunger 28 is retracted from the cavity 106, the pleats 105 fold and the bellows 100 accordions into a retracted position. As the second end log of the bellows withdraws from the working chamber 22, the discharge valve 46 closes and the suction valve 42 opens. Fluid is pulled into the working chamber 22 through the intake opening 40. The bellows 100 is shown in its retracted position in FIG. 5.

The cavity 106 should be maintained at approximately the same pressure as the working chamber 22. Such pressure equalization protects the structural integrity of the bellows 100. Too low a pressure in the cavity 106 may cause the bellows 100 to collapse, while too high a pressure in the cavity may cause the bellows 100 to balloon outward.

The fluid is provided at low pressure, or vacuum pressure, when the fluid end 10 is not in operation. When the fluid end 10 operates, the pressure within the working chamber 22 is transferred directly to the bellows 100. The bellows then exerts a force on the fluid within the cavity 106. This causes the pressure differential to be minimal between the chamber 22 and the cavity 106. Preferably, this pressure differential is less than 500 psi.

The fluid end further comprises a clean-out section 48 that may be closed by a removable retainer nut 50. Components of the fluid end 10, such as the valve seats 29, valves 42, 46, and various seals may be serviced or replaced through the clean-out section 48.

The second section 24 is likewise enclosed by a retainer nut 50. Each retainer nut 50 and annular retainer nut 102 may be attached to the fluid end body 11 by bolts 52 extending into the body 11. In the nut 102, opening spaced peripherally about the central opening 104 receive the bolts 52. Such an arrangement may allow the nut 102 to be affixed to the body 11 without internal threads within the plunger bore 21.

Another embodiment, not shown in the figures, does not include any bolts 52. Instead, external threads are provided on each of the retainer nuts 52 and 102. These external threads mate with internal threads formed within the conduit into which the retainer nut is installed. Specifically, internal threads may be formed on each of the clean out section 48, first section 23, second section 24, and plunger bore 21.

The annular retainer nut 102 defines one or more grooves 130 formed in the central passage 104. These annular grooves 130 each contain a radial seal 132. The radial seals 132 prevent leakage of fluid from the cavity 106 as the plunger 28 reciprocates. To minimize the risk of leakage, the use of multiple seals at the central passage 104 is preferred.

The seals 132 are the only seals in the plunger bore which seal against a moving surface. As discussed above, the fluid in the cavity 106 may be a hydraulic oil or motor oil. As this fluid is not abrasive, the seals 132 that protect cavity 106 experience relatively low levels of wear. In contrast, in a conventional fluid end, the seals that bear against moving surfaces are exposed to the abrasive fluids that move through the chamber 22. These seals experience much greater levels of wear.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A fluid end comprising:
   a body having an external surface and a plunger bore disposed therein, the plunger bore opening at the external surface;
   a plunger having a first end, in which the first end is disposed within the plunger bore;
   a stuffing sleeve abutting the body within the plunger bore;
   a retainer nut disposed within the plunger bore, the retainer nut being at least partially surrounded by the stuffing sleeve; and
   a bellows having an interior separated from its exterior, the bellows situated within the plunger bore and at least partially surrounding the plunger.

2. The fluid end of claim 1 in which one end of the bellows is anchored within the plunger bore.

3. The fluid end of claim 1 wherein the retainer nut is disposed at a terminal end of the plunger bore.

4. The fluid end of claim 3 further comprising a plurality of bolts, in which the plurality of bolts extend through the retainer nut and attach the retainer nut to the body.

5. The fluid end of claim 3 in which the plunger bore has no internal threads formed within it.

6. The fluid end of claim 3 in which the retainer nut defines a fluid passage in communication with an internal cavity of the bellows.

7. The fluid end of claim 3 in which the plunger extends through the retainer nut and further comprising at least one seal disposed between the retainer nut and the plunger.

8. The fluid end of claim 1 in which a fluid is disposed in the interior of the bellows.

9. The fluid end of claim 8 in which the fluid is incompressible.

10. The fluid end of claim 9 in which the plunger bore is characterized by a working pressure, and in which the pressurized fluid in the interior of the bellows is maintainable in a range within 500 psi of the working pressure.

11. The fluid end of claim 9 in which a pressure differential between the interior and exterior of the bellows is no greater than about 500 psi.

12. The fluid end of claim 11 further comprising:
    a retainer nut disposed at a terminal end of the plunger bore;
    in which the retainer nut defines a fluid passage in communication with the internal cavity of the bellows.

13. The fluid end of claim 8 in which the fluid is hydraulic oil.

14. The fluid end of claim 1 further comprising:
    a fluid intake opening disposed in the body;
    a fluid discharge opening disposed in the body;
    a fluid-containing chamber in communication with the fluid intake opening, fluid discharge opening, and plunger bore;
    a suction valve disposed between the fluid intake opening and the fluid-containing chamber; and
    a discharge valve disposed between the fluid discharge opening and the fluid-containing chamber.

15. The fluid end of claim 1 in which the plunger bore is designated as a first plunger bore, the plunger is designated as a first plunger, and the bellows is designated as a first bellows, in which the body has second and third plunger bores formed therein, and further comprising:
    a second plunger having a first end, in which the first end is disposed within the second plunger bore;
    a second bellows having an interior separated from its exterior, the second bellows situated within the second plunger bore and at least partially surrounding the second plunger;
    a third plunger having a first end, in which the first end is disposed within the third plunger bore; and
    a third bellows having an interior separated from its exterior, the third bellows situated within the third plunger bore and at least partially surrounding the third plunger.

16. The fluid end of claim 1 in which the stuffing sleeve defines a shoulder and in which the bellows comprises an open first end and a closed second end, wherein:
    the bellows is secured within the plunger bore at its open first end by the retainer nut and the shoulder of the stuffing sleeve.

17. A fluid end comprising:
    a body having a plunger bore and a working chamber disposed at a first end of the plunger bore; and
    a kit, comprising:
      a retainer nut having a centrally disposed opening extending therethrough;
      a stuffing sleeve having a centrally disposed opening extending therethrough;
      an elongate plunger receivable through the opening of the retainer nut and the opening of the stuffing sleeve; and
      a bellows;
    in which the retainer nut extends within and encloses a second end of the plunger bore, the plunger extends through the opening of the retainer nut and the opening of the stuffing sleeve, the stuffing sleeve is disposed within the plunger bore and abutting the retainer nut, and the bellows envelops the plunger;
    wherein the retaining nut defines a fluid passage in communication with an interior of the bellows.

18. The fluid end of claim 17 in which the bellows is entirely made of steel.

19. The fluid end of claim 18 in which the plunger has a smooth external surface.

20. The fluid end of claim 17 wherein the retainer nut comprises a plurality of peripherally-distributed openings disposed about the centrally disposed opening and in which the kit further comprises a plurality of bolts receivable in the peripherally-distributed openings.

21. The fluid end of claim 17 in which the stuffing sleeve defines a shoulder and in which the bellows comprises an open first end and a closed second end, wherein:
    the bellows is secured within the plunger bore at its open first end by the retainer nut and the shoulder of the stuffing sleeve.

* * * * *

UNITED STATES PATENT AND TRADEMARK OFFICE
CERTIFICATE OF CORRECTION

PATENT NO. : 10,648,490 B2  
APPLICATION NO. : 16/043579  
DATED : May 12, 2020  
INVENTOR(S) : Foster et al.

Page 1 of 1

It is certified that error appears in the above-identified patent and that said Letters Patent is hereby corrected as shown below:

In the Specification

Column 3, Line 55, please delete "log" and substitute therefore, "109".  
Column 3, Line 66, please delete "log" and substitute therefore, "109".  
Column 4, Line 6, please delete "log" and substitute therefore, "109".

Signed and Sealed this  
Sixteenth Day of June, 2020

Andrei Iancu  
*Director of the United States Patent and Trademark Office*